Figure 1:
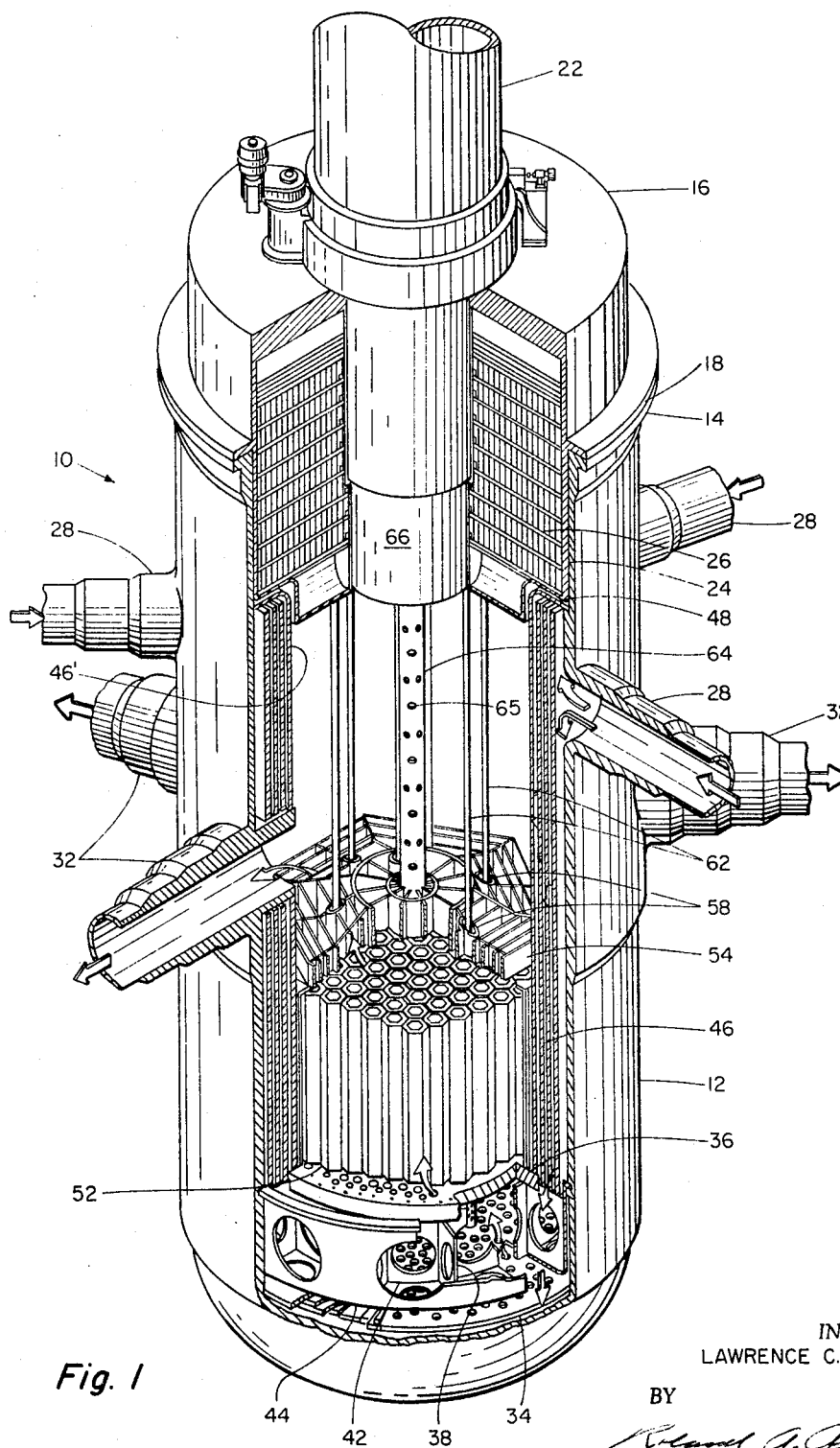

Sept. 6, 1966          L. C. NODERER          3,271,260

LIQUID METAL FAST BREEDER REACTOR

Filed May 20, 1964          4 Sheets-Sheet 1

INVENTOR.
LAWRENCE C. NODERER

Sept. 6, 1966 L. C. NODERER 3,271,260
LIQUID METAL FAST BREEDER REACTOR
Filed May 20, 1964 4 Sheets-Sheet 2
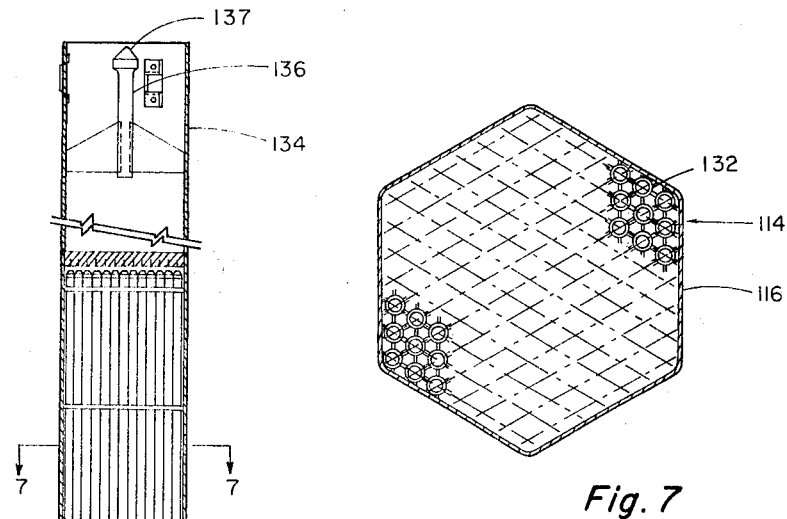
Fig. 7
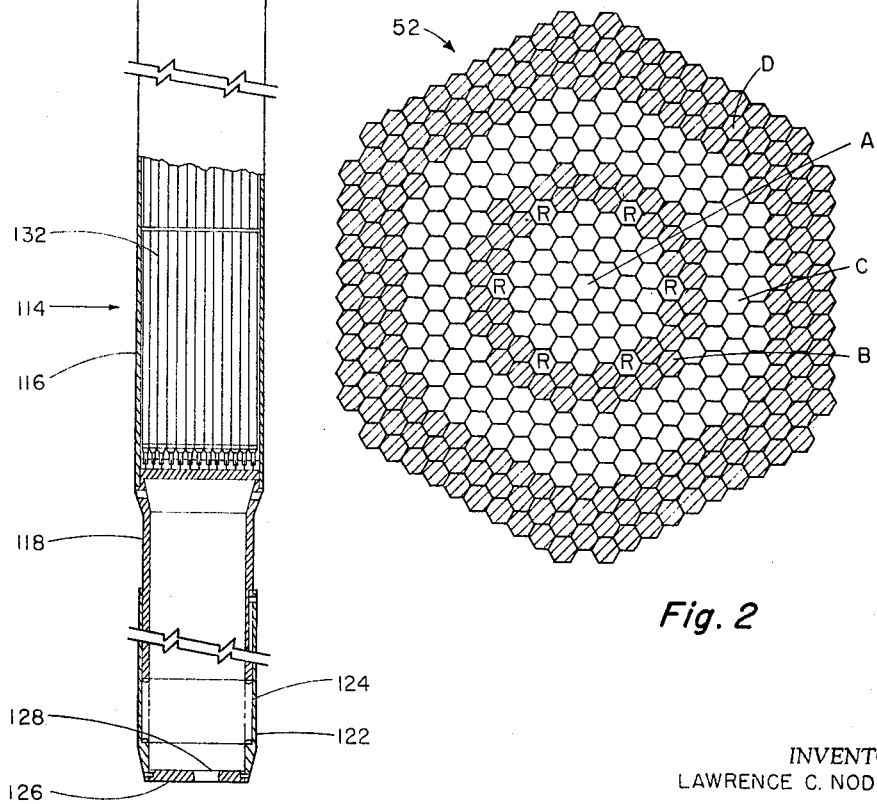
Fig. 6
Fig. 2
INVENTOR.
LAWRENCE C. NODERER
BY

INVENTOR.
LAWRENCE C. NODERER

Sept. 6, 1966  L. C. NODERER  3,271,260
LIQUID METAL FAST BREEDER REACTOR

Filed May 20, 1964  4 Sheets-Sheet 4

INVENTOR.
LAWRENCE C. NODERER
BY

United States Patent Office 3,271,260
Patented Sept. 6, 1966

3,271,260
LIQUID METAL FAST BREEDER REACTOR
Lawrence C. Noderer, Windsor, Conn., assignor to the United States of America as represented by the United States Atomic Energy Commission
Filed May 20, 1964, Ser. No. 369,029
6 Claims. (Cl. 176—18)

The present invention concerns a liquid metal fast breeder reactor and more particularly, a liquid metal fast breeder reactor having a negative coolant density coefficient of reactivity.

Due to limited availability of $U^{235}$, there has been increasing interest during the last few years in nuclear power reactors having the additional capability of producing fissionable fuel. Such reactors, known as breeders, hold out the hope of virtually unlimited fuel reserves and consequently there has been increasing activity in developing breeder reactor concepts.

A proposed nuclear reactor having the ability to produce power and fissile material simultaneously is a sodium-cooled fast neutron reactor utilizing $U^{235}$ and $Pu^{239}$ as fuel and the material $U^{238}$ as the fertile material. A fast neutron reactor is selected because of the smaller fuel inventory required and the sodium is selected as coolant because of its desirable heat transfer characteristics, heat carrying capability and its relatively low neutron absorption cross-section.

A reactor which has been designed as described above, does have one drawback which, though not barring its use, does raise additional problems of safety. This is that the reactor has a positive sodium density reactivity coefficient. In other words, with decreased sodium density (as at higher temperatures) there is a slight increase in reactivity. In the ultimate case of sodium loss, it could mean that a sub-critical or slightly critical core can become critical or super-critical. Hence, in such a reactor design, draining the sodium can not be expected to shut down the reactor.

The present invention retains all of the previously enumerated advantages of the described sodium-cooled fast breeder reactor but provides the reactor with a negative sodium density coefficient of reactivity. In the case of an emergency the sodium can be withdrawn to reduce reactivity and in the case of a sodium leak this will automatically come about, thereby reducing the extent and expense of additional safety devices and measures which otherwise would be required in order to obtain the required degree of safety and the built-in safety factors.

It is thus a first object of this invention to provide a liquid metal cooled reactor having a negative coefficient of reactivity.

Another object of the invention is to provide a liquid metal cooled fast breeder reactor having a negative coefficient of reactivity.

Still another object is to provide a fast breeder reactor with a negative coefficient of reactivity.

Another object is a liquid metal cooled reactor in which reactivity is reduced with loss of coolant.

Figure 3:
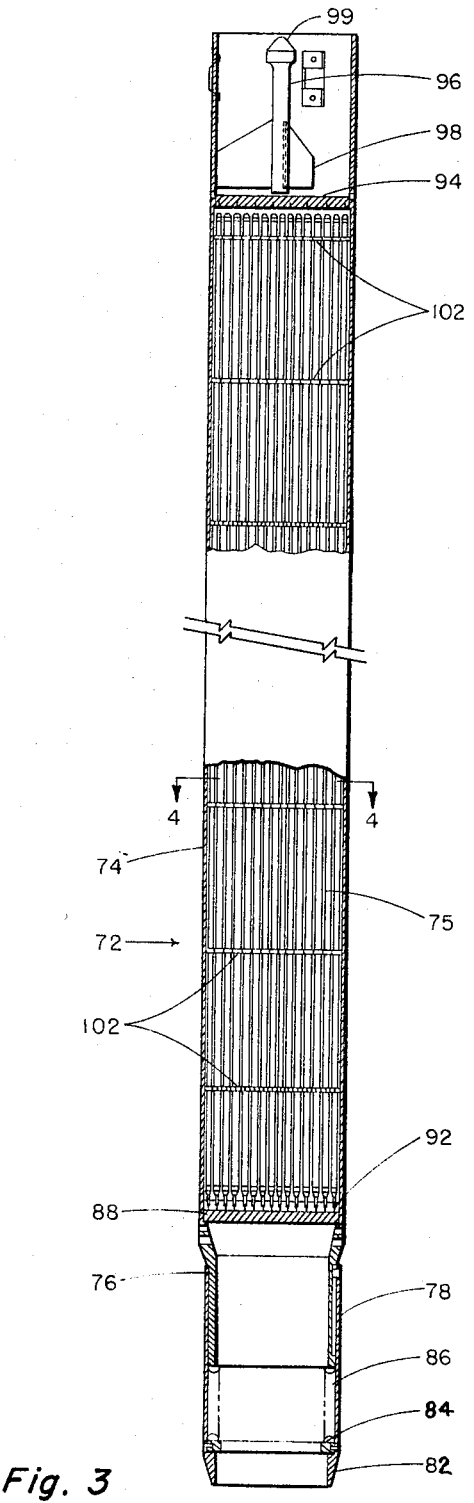
Figure 5:
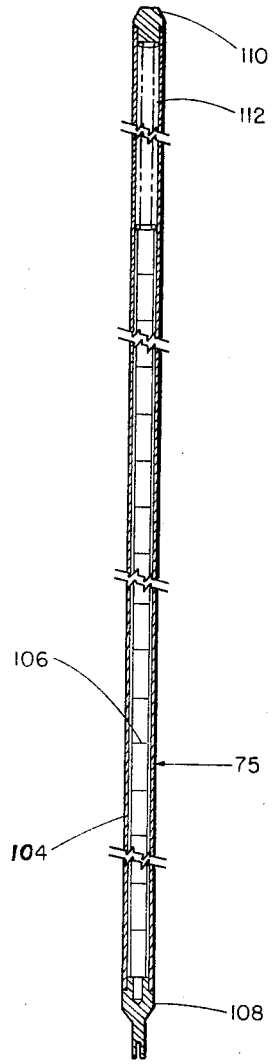
Figure 8:
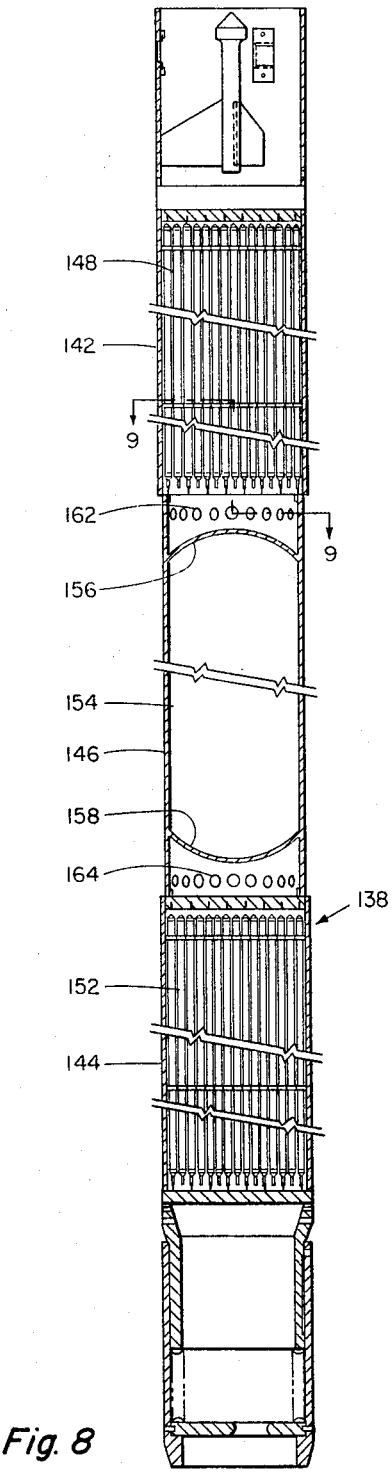
Figure 9:
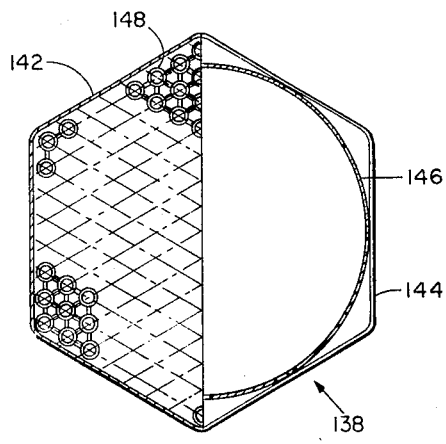
Figure 4:
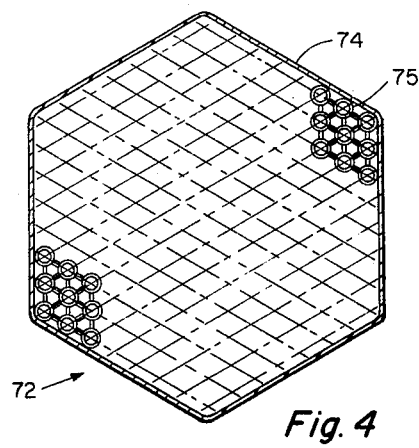

Other objects and advantages of this invention will become obvious from the following description of a preferred embodiment of this invention taken with the accompanying drawings in which:

FIG. 1 shows an isometric view of a preferred embodiment of this invention with a section partially cut away;
FIG. 2 is a plan view of the core partially schematized;
FIG. 3 is an elevation view in section of a typical fuel element;
FIG. 4 is a view along 4—4 of FIG. 3;
FIG. 5 is an elevation view in section of a typical fuel rod;
FIG. 6 is an elevation view in section of a typical fertile fuel assembly;
FIG. 7 is a view along 7—7 of FIG. 6;
FIG. 8 is an elevation view of a fuel assembly with a void section; and
FIG. 9 is a view along 9—9 of FIG. 8.

Previous attempts have been made to obtain a negative coefficient of reactivity in this type of reactor but all of those mentioned have introduced new problems of even greater complexity. Materials having certain neutron absorption and scattering characteristics possibly could be inserted into the core but this will reduce the efficiency or breeding capabilities of the reactor and affect unfavorably the capital costs required.

The present invention brings about the described result without any significant decrease in efficiency. It is accomplished by introducing between the core and the blanket an annular section containing void regions. These void regions contain air or inert gases which absorb less neutrons than even the sodium. In addition, the inert regions will have less slowing down effect on the fast neutrons passing from the core to the blanket region. Thus, there will be no neutron loss introduced by the void regions. However, the neutrons once having escaped from the core region into the blanket region have a lesser probability of coming back into the core than if the core and blanket regions were not separated by these void regions. This effect is due to the relative size of the core and the blanket region which surrounds and is spaced from the former. Thus, when sodium is drained from the core (or when its density is decreased) there is increased leakage of neutrons from the core into the blanket region without a fully compensating leakage of neutrons back, producing in effect the negative sodium density coefficient of reactivity.

For a detailed description of a preferred embodiment incorporating the principles of this invention, reference is made to FIG. 1 wherein is illustrated a nuclear reactor 10 consisting of a right cylindrical pressure vessel 12 closed at the bottom and terminating above in a flange 14. A top closure 16 with a flange 18 resting on flange 14 seals pressure vessel 12. Closure 16 has a housing 22 to carry the control rod drives and refueling equipment not shown and not forming a part of this invention. Closure 16 also has an internal annular extension 24 extending down into vessel 12 to help support shielding blocks 26 occupying the upper space within vessel 12. As will be further described below, the arrangement is such that when top closure 16 is raised, the shielding blocks 26 are removed with the former, thereby exposing the lower portion of the interior of vessel 12 for inspection, maintenance and other desired procedures within reactor 10. As is understood in the art, flanges 14 and 18 would be bolted together.

Pressure vessel 12 is provided with several liquid metal coolant inlet nozzles 28 and several coolant outlet nozzles 32. While not shown in FIG. 1, separate nozzles may be provided for coolant overflow, and for decay heat removal connected with routine or emergency shut-down of reactor 10.

Within vessel 12 there are provided a pair of horizontally disposed grid plates 34 and 36 which are provided with holes or openings to permit flow of coolant therethrough. Grid plate 34 would be supported above the bottom of vessel 12 by structural members (not shown) while an assembly of vertical plates 38 and cylinders 42 and 44 would be used to support plate 36 above plate 34. A plurality of spaced cylindrical thermal shields generally indicated by numeral 46, extend up from plate 36 to a point just below shielding blocks 26, above inlet nozzles 28. Outlet nozzles 32 extend through the thermal shields 46 as shown while inlet nozzles 28 do not extend through these shields. The innermost thermal shield 46' has an annular shoulder 48 which extends outwardly to the wall of vessel 12 where it would be welded or otherwise attached to provide a seal. The remaining thermal shields 46 do not touch shoulder 48 so that coolant entering by way of nozzles 28 will flow in and around the spaces between shields 46 as illustrated by the arrows.

Resting on upper grid plate 36 is a honeycomb-shaped structure 52 which in this case is formed from stainless steel sheet. Structure 52 has an overall configuration of a right hexagonal cylinder as illustrated in FIG. 2. The spaces within honeycomb-structure 52 are filled with the various fuel and breeder assemblies to be described below.

Resting on top of honeycomb-structure 52 is a fuel hold-down grid structure 54 which consists of a series of annular plates and ribs as shown. Built into the structure 54 are circular tubes 58 to accommodate control rods 62, each of which extends down into a channel in honeycomb-structure 52. Hold-down structure 54 is clamped down on a honeycomb-structure 52 by a hold-down tube 64 to prevent movement and vibration as well as to maintain proper alignment. Hold-down tube 64 is provided with openings 65 to permit coolant to flow therethrough.

A cylindrical section 66 extends down from housing 22 into vessel 12 to a point below shielding blocks 26. Control rods 62, hold-down tube 64, and fuel handling equipment (not shown) would be contained within section 66 for extension down into vessel 12 as is now generally well understood in the art.

Referring to FIG. 2 for a closer look at the arrangement of assemblies within honeycomb-structure 52, it will be seen that the core of reactor 10 occupies the central region of structure 52 consisting of a pair of zones A and B of different fuel enrichment. Within the core are located the several control rod positions designated R. The breeder or radial blanket region of the core occupies the outer zone D while the so-called void region occupies an annular zone C separating regions B and D. Special fuel assemblies containing void chambers occupy the positions or the channels in zone C. The effect of the void region as well as the details of the various assemblies will be described below.

As will be seen in FIGS. 3 and 4, each fuel assembly 72 occupying a channel within zones A and B shown in FIG. 2 consists of a hexagonal tube 74 containing fuel rods 75 and terminating at the bottom in a neck section 76 over which slides a lower support tube 78 with an orifice tip 82 containing an orifice ring 84. A coil spring 86 mounted between ring 84 and the bottom edge of section 76 insures a snug fit of assembly 72 in its own channel.

A lower grid plate 88 above section 76 having a plurality of suitable fittings 92 to engage the bottom of each of fuel rods 75 is positioned as shown. Within tube 74 are fuel rods 75 extending substantially the whole length of tube 74. Above fuel rods 75 is an upper grid plate 94 to hold fuel rods 75 down in place as shown. A shank 96 with braces 98 attached to the wall of tube 74, and having a knob 99, makes it possible to lift each fuel assembly 72 out of its channel. A plurality of spacer bands 102 located at intervals along the length of tube 74 insure spacing and rigidity of the bundle of fuel rods 75. Bands 102 can be of any convenient design and may be simple bands wrapped around each rod 75 with links to the bands around adjacent rods, as illustrated in FIG. 4.

As shown in detail in FIG. 5, each fuel rod 75 consists of a cylindrical tube 104 containing a plurality of fuel pellets 106 with a lower end cap 108 backed to engage with a fitting 92 and an upper end cap 110 to close off the top of tube 104. A spring 112 may be used below upper end cap 110 to secure pellets 106 in place. The fuel pellets in this reactor may consist of mixtures of $PuO_2$ and $UO_2$ or of mixtures of UC and PuC. In the case of these materials, the uranium would be substantially all $U^{238}$ so that the fission process is derived from the plutonium. The use of a fertile uranium isotope helps to extend the life of the core. The supporting structure described would all be stainless steel.

In zone D of honey-combed structure 52, which is the outer blanket region of reactor 10, there are utilized as shown in FIGS. 6 and 7 a plurality of blanket assemblies 114 having a construction similar to that of fuel assemblies 72 and consisting of a hexagonal cylinder 116 with a circular lower neck section 118 and a lower sleeve tube 122 with a spring 124. A plate 126 with an orifice 128 controls flow into tube 116. A plurality of blanket rods 132 occupy the inside of tube 116, rods 132 containing the pellets as in the fuel assemblies which, however, would consist of an appropriate fertile material such as $U^{238}$. Upper section 134 of tube 116 is provided with a shank rod 136 and lifting knob 137 to permit removal of assembly 114 when desired.

Within zone C of reactor 10, there are provided a plurality of fuel bundle assemblies 138 as shown in FIGS. 8 and 9. Each assembly 138 consists of a pair of upper and lower hexagonal tubular sections 142 and 144 with intermediate circular section 146 of reduced overall diameter. The upper and lower sections 142 and 144 are similar to the assemblies previously described, except that they are each provided with a plurality of shortened blanket rods 148 and 152 respectively forming axial blanket regions. Rods 148 and 152 contain pellets of material identical to that found in zone D. Intermediate section 146 of assembly 138 is provided with a sealed chamber 154 having upper and lower sealing caps 156 and 158, respectively. Sealed chamber 154 contains an inert gas such as helium under low or intermediate pressure. Above chamber 154 are a series of holes 162 while below the former are holes 164, in the wall of section 146. Coolant flow passing up through the spaces between rods 152 will pass out through holes 164, travel up the outside of chamber 154 and then re-enter assembly 138 through holes 162.

In the operation of reactor 10, liquid metal sodium enters vessel 12 through inlet nozzles 28. The coolant flows down, around and between thermal shields 46 filling the spaces within and around fuel and blanket assemblies and flowing directly in contact with the spaced fuel and blanket rods previously described. The coolant leaves structure 52 at the top filling the space in vessel 12 above the former. The heated sodium leaves reactor 10 by way of nozzles 32 and would thereafter be used as a source of heat as in a steam generator, before being returned to reactor 10 by way of nozzles 28.

As is understood in the art, reactor 10 is controlled in operation by the selective insertion and withdrawal of control rods 62. The effect of the void region in zone C of reactor 10 containing sealed chambers 154 of an inert gas is to produce a negative sodium density coefficient of reactivity, i.e., at increasing temperature and/or decreasing density of the sodium coolant, there is a tendency for reactor 10 to become less reactive, or, in the extreme case, when there is a loss of sodium resulting in a decrease in overall sodium density, there is a loss in reactivity. If zone C were fully occupied by blanket or fuel assemblies instead of having the void region, the effect is to produce in reactor 10 a positive reactivity coefficient. For reasons of safety and ease of control and to simplify maintenance procedures, a negative coefficient of reactivity is desired. While the sodium does not primarily serve as a moderator in reactor 10, it is well understood that it does absorb some neutrons and does have some moderating effect. The coefficient of reactivity is less negative for a sodium cooled reactor with a blanket than for a reactor without a blanket because when no blanket is present, no core leakage neutrons return to the core. Hence the increased leakage from the core due to reduced sodium coolant density is effective in reducing reactivity whereas a blanket will return approximately the same fraction of leakage neutrons hence reducing the leakage reactivity effect. Introduction of the void region in effect simulates as far as the coefficient of reactivity is concerned, a core without a blanket and the manner by which this is done as described above accomplishes this result without sacrificing any of the nuclear characteristics of the reactor and most important, without affecting adversely the breeding ratio providing the blanket is thick enough. As the gap or void region is increased in size, the core leakage, and hence its plutonium concentration, also increases. The lower core internal breeding ratio would be more than offset by the increased fractional neutron absorption in the blanket, which has a higher breeding ratio because of its smaller plutonium concentration.

From a physical point of view the effect can be visualized by realizing that when the neutrons leak from the core to the blanket, there is little loss or absorption or effect arising out of the void region. However, looking back from the blanket, which in an exaggerated example is looking back from an annular ring to a pea at the center of a circle, there is reduced area exposed to the neutrons in the blanket with the result that less neutrons return. Therefore, increased neutrons which result from decrease in sodium density or in sodium loss causes more neutrons to enter the blanket but not return and therefore are not available to heighten the reactivity of the core.

It should be noted that the inner and outer core zone fuel assemblies contain $U^{238}$ in the UC so that it is the plutonium which fissions and the $U^{238}$ is converted to a fissionable isotope of plutonium. Thus, some breeding does take place in the core but more plutonium is used up than is produced with the result that core life is extended. The outer core zone as will be seen below has a somewhat smaller breeding ratio in order to increase the power output so as to flatten power production across the core. In the blanket regions, of course, the isotopic composition of the plutonium is such as to obtain a breeding ratio greater than unity.

A specific example of the reactor described above is given in Table I. In the particular example given in the table below pertaining to the reactor embodiment described above all of the pellets used in the various regions of the core and blanket contain mixtures of UC and PuC having the particular compositions as described in the table.

It is thus seen that there has been provided a unique liquid metal fast breeder reactor with provision to cause a negative coolant density coefficient of reactivity without sacrificing breeding ratio significantly or other important nuclear characteristics. While only a preferred embodiment of the invention has been described, it is understood that the scope of the invention is to be limited only by that of the appended claims.

I claim:
1. A liquid metal cooled fast breeder nuclear reactor comprising:
   (a) a reactive core containing fissile material;
   (b) a blanket region surrounding said core containing fertile material; and
   (c) a zone between said core and said blanket region containing means to reduce the absorption of neutrons passing from the reactive core to said blanket region, said means being surrounded within said zone by axial regions of fuel and fertile material mixtures.
2. The reactor of claim 1 in which the core and blanket region contain mixtures of fissile and fertile materials, said core using more fissile material than is produced and the blanket region producing more fissile material than is being used.
3. A liquid metal cooled fast breeder nuclear reactor comprising:
   (a) a reactive core;
   (b) a blanket region surrounding said core;
   (c) a zone within said blanket region immediately adjacent and surrounding said core containing means including sealed pockets of inert gaseous material to reduce the absorption of neutrons passing from the reactive core to said blanket region; and
   (d) means for circulating liquid metal coolant through said reactive core and said blanket region, said coolant circulating around said sealed pockets.
4. The reactor of claim 3 in which said reactive core and blanket region contained mixtures of PuC and UC, said U being substantially all a fertile isotope and said Pu being largely fissile.
5. The reactor of claim 4 in which said liquid metal coolant is sodium.
6. The reactor of claim 5 in which said core consists of two zones of fuel enrichment, the outer zone containing sufficient fissile Pu to effect power flattening across the core.

(References on following page)

Table I

|  | Volume Fraction | | SS. | G. Pu/Kg.[1] Fuel (metal) | Outer Radius, inches | Height, inches |
|---|---|---|---|---|---|---|
|  | Na | Fuel |  |  |  |  |
| Inner Core Zone | .65 | .25 | .10 | 137.9 | 21.6 | 60 |
| Outer Core Zone | .65 | .25 | .10 | 206.9 | 30.6 | 60 |
| Void | .10 |  | .03 |  | 54.6 | 60 |
| Radial Blanket | .45 | .50 | .05 | 26.6 | 69.6 | 84 |
| Axial Blankets | .65 | .25 | .10 | 19.5 | 54.6 | 18 |

[1] Equilibrium:

|  | PU-239 | Pu-240 | Pu-241 | Pu-242 |
|---|---|---|---|---|
| Isotopic Pu Composition, Percent: |  |  |  |  |
| Core | 68.6 | 26.2 | 4.1 | 1.0 |
| Blanket | 94.8 | 5.0 | .2 | 0 |

References Cited by the Examiner

UNITED STATES PATENTS

| | | | |
|---|---|---|---|
| 3,140,234 | 7/1964 | Loewenstein | 176—17 |
| 3,169,117 | 2/1965 | Dickinson et al. | 176—40 X |
| 3,205,139 | 9/1965 | Stewart et al. | 176—18 |

FOREIGN PATENTS

| | | |
|---|---|---|
| 829,139 | 2/1960 | Great Britain. |
| 883,196 | 11/1961 | Great Britain. |
| 917,461 | 2/1963 | Great Britain. |

OTHER REFERENCES

Reactor Science and Technology, 1961, vol. 14, pp. 31, 38, 39, 42, 43, 44, and 45.

REUBEN EPSTEIN, *Primary Examiner.*